Jan. 19, 1965   H. C. TEETOR ETAL   3,165,779
FISH CLEANER
Filed April 26, 1962
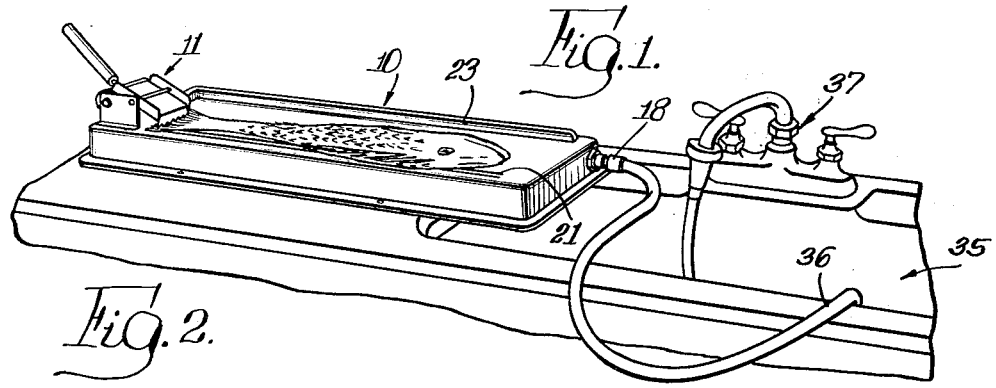
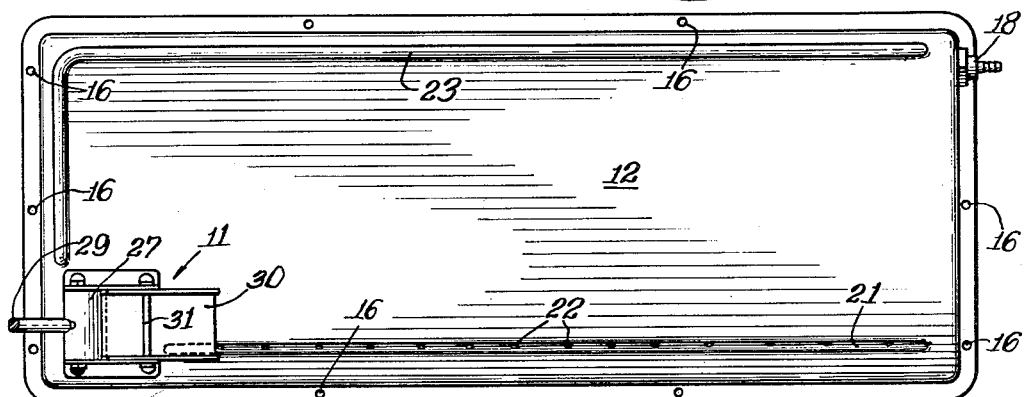
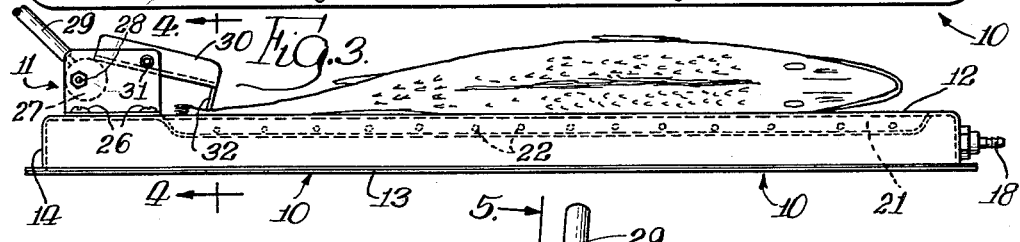
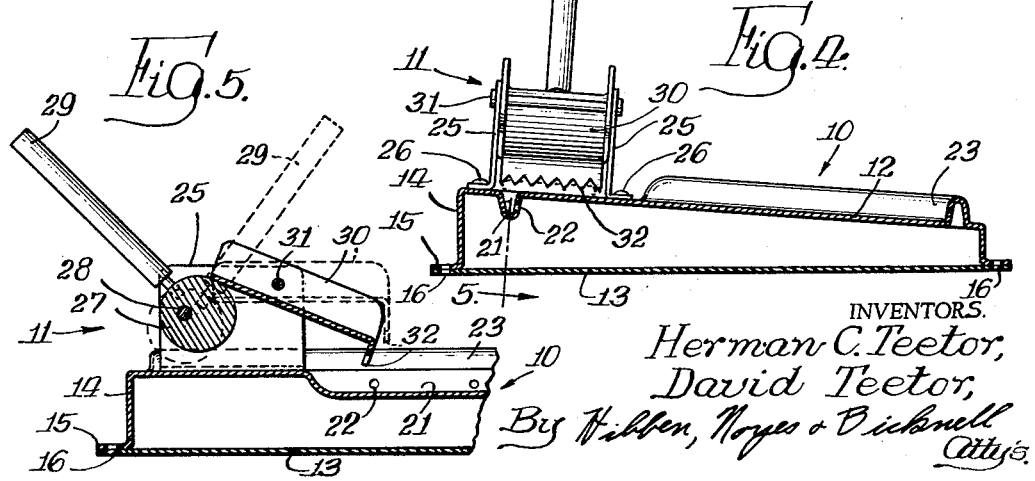
INVENTORS.
Herman C. Teetor,
David Teetor,
By Hibben, Noyes & Bicknell
Attys.

3,165,779
FISH CLEANER
Herman C Teetor and David Teetor, both % Perfect Circle Corp., 552 S. Washington St., Hagerstown, Ind.
Filed Apr. 26, 1962, Ser. No 190,407
7 Claims (Cl. 17—8)

This invention relates to an improved fish cleaning device.

It is a primary object of this invention to provide a fish cleaner that is lightweight and readily transported when not in use but is firm and substantially immovable when it is in use.

It is another object to provide a fish cleaner that washes a fish while it is being cleaned.

Still another object is to provide a fish cleaner having means for firmly holding a fish in a convenient position for cleaning.

A further object is to provide a novel clamp for holding a fish while it is being cleaned.

Other objects and advantages of the invention will become apparent from the following detailed description taken in conjunction with the accompanying figures of the drawing, in which:

FIG. 1 is a perspective view showing a fish cleaner embodying the invention;

FIG. 2 is an enlarged plan view of the fish cleaner;

FIG. 3 is a side elevational view of the fish cleaner;

FIG. 4 is an enlarged sectional view taken on the line 4—4 of FIG. 3; and

FIG. 5 is a sectional view taken on the line 5—5 of FIG. 4.

Generally, a fish cleaner embodying the invention comprises a hollow tank and a clamp secured to the tank to hold the fish on the upper surface of the tank. A hose is coupled to the tank and, when the device is to be used, the hose is connected to a suitable water outlet and the tank is filled with water. An indentation formed along one edge of the upper surface has a series of small holes formed near its bottom, out of which water flows onto and across the upper surface. The water in the tank serves both to hold the tank in place due to its weight and to wash the fish during the cleaning operation. The tank is shaped to cause the water to flow around the fish and off one end of the upper surface.

The clamp holds the fish in place on the upper surface of the tank while it is being cleaned. This clamp comprises a pivotally mounted clamping member having teeth at one end for holding the tail of a fish. A roller is positioned underneath the other end of the clamping member and adapted to pivot the clamping member to either grip the fish or release it.

In greater detail, the fish cleaner comprises a tank, indicated generally by the numeral 10, and a clamp, indicated generally by the numeral 11, mounted on an upper cleaning surface 12 of the tank 10. The tank 10 includes a rectangular imperforate bottom plate 13, FIGS. 3, 4 and 5, and an upper cover 14 of inverted dished form. The plate 13 and the cover 14 are preferably made of a relatively rigid corrosion resistant material such as plastic or fiber glass. The cover 14 along its lower edge is provided with an outturned flange 15 which is secured to the plate 13 by a suitable process, such as heating and pressing, to provide a fluid tight connection between the cover and the plate. A plurality of holes 16 may be formed through the flange 15 and plate 13 for the purpose of securing the tank to a bench when a permanent installation is desired. The cover 14 is also provided at one end with a hose coupling 18 which is adapted to be connected to a suitable water hose.

The upper cleaning surface 12 of the cover 14 is preferably generally flat and rectangular. Adjacent one edge of the cleaning surface 12, an indentation 21 is formed in the cover and a series of small openings 22 are formed through the tank near the bottom of the indentation. From the edge of the cleaning surface 12 adjacent the indention 21, the cleaning surface 12 slopes downwardly to the opposite edge as shown in FIG. 4. Along this opposite edge and the edge opposite the coupling 18, the cover is formed with an upstanding ridge indicated generally by the numeral 23.

The clamp 11 comprises two mounting brackets 25 secured to the cover 14, as by suitable rivets or nut and bolt combinations 26. A cylinder 27, preferably made of wood, is rotatably mounted off center on a mounting shaft 28, FIG. 5, and a handle 29 secured to the cylinder 27 extends substantially radially outward from the cylinder. Also tiltably mounted on a pin 31 between the two mounting brackets 25 is a clamping member 30 in the form of a channel with the pin 31 extending through the flanges of the channel. One end of the clamping member 30 is positioned over the surface of the cylinder 27, and the web of the channel at the other end of the member 30 is provided with a plurality of downwardly extending teeth 32. When the handle 29 and the cylinder 27, which form a cam, are turned in the counterclockwise direction to the solid line position of FIG. 5, the increasing distance from the pin 31 to the surface of the cylinder at the point of contact with the clamping member due to the rise in the cam raises the adjacent end of the clamping member and causes the teeth 32 to move downwardly. When the handle 29 and cylinder 27 are turned in the clockwise direction, as shown in dotted lines in FIG. 5, the line of contact of the cylinder with the adjacent end of the member 30 permits the latter to pivot to the dotted line position of FIG. 5.

When the handle 29 is swung to this position, it engages the adjacent end of the member 30 to force it downwardly and thus move the teeth 32 out of clamping engagement with the fish. The clamping member 30 is preferably mounted sufficiently close to the cylinder 27 that the line of contact between these two members is always above a line drawn between the pin 31 and the longitudinal center line of the cylinder 27, so that the end of the clamping member adjacent the cylinder 27 cannot slide downwardly past the cylinder.

To clean a fish using the fish cleaner, the tank 10 is positioned on a stand adjacent a water outlet and a suitable receptacle. FIG. 1 shows the fish cleaner on a counter of a kitchen sink 35 with the end of the tank having the coupling 18 over the bowl of the sink. A hose 36 is connected between the coupling 18 and a water faucet 37, and the tank 10 is filled with water. As soon as the tank is full, water flows upwardly out of the holes 22 in the indentation 21 and onto the cleaning surface 12. Due to the slope of the cleaning surface 12, the water spreads across the cleaning surface 12 and the ridge 23 causes it to flow off the tank at the end positioned over the bowl of the sink. The faucet 37 is preferably adjusted to maintain a sheet of water over the cleaning surface 12. By placing the water outlet holes 22 at the bottom of indentation, the danger of water shooting upwardly in the event the water pressure in the tank is too great is virtually eliminated because the indentation becomes filled with water which slows down the water issuing from the holes 22. Further, the indentation causes the water to flow onto the cleaning surface throughout its entire length, rather than only in the area of each hole.

Thereafter, a fish to be cleaned is placed on the cleaning surface 12 with its tail under the teeth 32 of the clamp. The handle 29 is then turned to the left as seen in FIG. 5 to cause the teeth 32 to engage the tail as shown in FIGS. 1 and 3. The clamping member 30 is mounted sufficiently high on the mounting brackets 25 that the teeth 32 slant toward the brackets 25 so that the teeth have a firm hold on the tail and prevent the tail from being pulled out of the clamp. While the fish is being cleaned the water flowing around it washes the fish and carries away debris. The water in the tank also holds the fish cleaner firmly in place due to its weight while it's being used. After the fish is cleaned the handle 29 is turned to the right until it engages the adjacent end of the clamping member 30 and causes the latter to rotate counterclockwise and release the fish. When all the fish are cleaned the hose 36 is disconnected and the water inside the tank 10 is drained through the coupling 18.

If desired, the clamp 11 may be mounted on a different cleaning surface such as a stationary wooden bench. This clamp is advantageous because it is rugged and all parts are accessible so that they may be easily cleaned. Further, the cylinder 27 and the handle 29 cause the clamping member 30 to either engage and hold the fish or to release the fish. In addition, the weight of the handle 29 when turned to the right as seen in FIG. 5 holds the clamping member 30 with the teeth 32 raised, making it easier to position a fish in the clamp 11.

We claim:

1. A fish cleaner comprising a hollow tank adapted to be filled with water and having a substantially flat outer cleaning surface, means for coupling the interior of said tank to a water outlet for filling said tank with water, said tank having an elongated indentation formed therein adjacent said cleaning surface and having a plurality of holes formed therethrough adjacent the bottom of said indentation, said cleaning surface sloping downwardly away from said indentation, and an upstanding ridge formed on said cleaning surface in spaced relation to said indentation, whereby water flowing from said holes is directed in sheet form downwardly across said cleaning surface to said ridge for discharge at one end of said cleaning surface.

2. A fish cleaner as in claim 1, wherein said cleaning surface is generally oblong, said indentation extends along and adjacent one side of said surface, and said ridge extends along the other side of said surface and one end, whereby water flows off said cleaning surface at the other end thereof.

3. A fish cleaner as in claim 2, wherein said coupling means is located adjacent said other end of said cleaning surface, whereby said cleaner may be placed on the counter of a sink with said coupling means connected to a faucet over the bowl of the sink and the water flowing off said cleaning surface flows into the bowl of the sink.

4. A fish cleaner comprising a supporting member having an elongated, substantially flat upper cleaning surface, said surface being transversely inclined, water discharge means arranged longitudinally of said cleaning surface and including a plurality of holes adjacent the upper longitudinal edge of said surface, and means for delivering water to said holes for discharge through said holes to flow in sheet form downwardly across said transversely inclined surface.

5. A fish cleaner as in claim 4, and further including a clamp secured to said supporting member adjacent said cleaning surface for holding a fish on said cleaning surface while it is being cleaned.

6. A fish cleaner as in claim 5, wherein said clamp comprises a clamping member pivotally mounted intermediate its two ends, one of its ends having downwardly extending teeth formed thereon for gripping a fish against said surface, a roller rotatably mounted off center adjacent to and underneath the other end of said clamping member, and handle means secured to said roller for manually rotating said roller to cause said roller to force said other end upwardly and said teeth downwardly to grip a fish.

7. A fish cleaner as defined in claim 4 wherein said water discharge means includes an elongated indentation formed in said cleaning surface adjacent said upper longitudinal edge thereof and having said plurality of holes arranged longitudinally therein adjacent the bottom of said indentation.

References Cited in the file of this patent

UNITED STATES PATENTS

| | | |
|---|---|---|
| 1,617,484 | Holt | Feb. 15, 1927 |
| 2,110,341 | Rindt | Mar. 8, 1938 |
| 2,262,767 | Jeter | Nov. 18, 1941 |
| 2,300,321 | Swezey | Oct. 27, 1942 |
| 2,511,592 | Krafczyk | June 13, 1950 |